United States Patent [19]

Yagi et al.

[11] 4,159,889
[45] Jul. 3, 1979

[54] METHOD OF AND APPARATUS FOR TREATING THE OUTER SURFACE AND INNER SURFACE OF A PIPE OF A THERMOPLASTIC RESINOUS MATERIAL PRODUCED BY EXTRUSION

[75] Inventors: Kazuo Yagi, Iwakuni; Kazuhiro Masumoto, Yamaguchi, both of Japan

[73] Assignee: Mitsui Petrochemical Industries, Inc., Tokyo, Japan

[21] Appl. No.: 771,423

[22] Filed: Feb. 24, 1977

Related U.S. Application Data

[62] Division of Ser. No. 507,276, Sep. 19, 1974, abandoned.

[30] Foreign Application Priority Data

Sep. 26, 1973 [JP] Japan ............................ 48-107543
Sep. 26, 1973 [JP] Japan ............................ 48-111459

[51] Int. Cl.² ............................................. B29C 17/07
[52] U.S. Cl. .................................... 425/71; 264/565;
264/209; 264/210 R; 425/72 R; 425/326.1;
425/387.1
[58] Field of Search ................. 264/209, 85, 94, 98,
264/99, 176 R, 236, 210 R; 425/107, 90, 326.1,
387.1, 71, 72 R

[56] References Cited

U.S. PATENT DOCUMENTS

| 2,616,126 | 11/1952 | Merck et al. ............... 425/107 |
| 3,088,167 | 5/1963 | Corbett ......................... 425/72 |
| 3,264,384 | 8/1966 | Settele .......................... 264/95 |
| 3,275,723 | 9/1966 | Cappuccio ..................... 264/95 |
| 3,388,425 | 6/1968 | Detter ............................ 264/95 |
| 3,517,097 | 6/1970 | Mixell et al. ............... 425/107 |
| 3,522,337 | 7/1970 | Ball ............................... 425/72 |
| 3,538,210 | 11/1970 | Gatto ............................ 264/90 |
| 3,699,199 | 10/1972 | MacDuff ...................... 264/99 |
| 3,812,230 | 5/1974 | Takahashi ..................... 264/89 |

Primary Examiner—Jeffery R. Thurlow
Attorney, Agent, or Firm—James E. Nilles

[57] ABSTRACT

A method of treating the outer surface of a pipe of a thermoplastic resinous material produced by extrusion by extruding molten resin from an extruder and sizing the same by a sizing die, and supplying a lubricant to a front end portion of the sizing die along the front end portion which is disposed in spaced juxtaposed relationship with the extruder.

An apparatus for treating the outer surface of a pipe of a thermoplastic resinous material produced by extrusion including a sizing die for sizing the pipe extruded from an extruder for extruding a thermoplastic resin in tubular form, and lubricant supply means disposed at a front end portion of the sizing die in spaced juxtaposed relationship with the extruder for supplying a lubricant along the front end portion of the sizing die.

4 Claims, 9 Drawing Figures

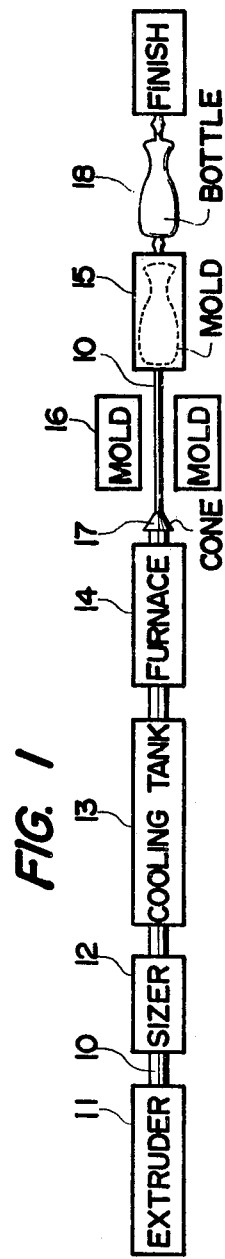
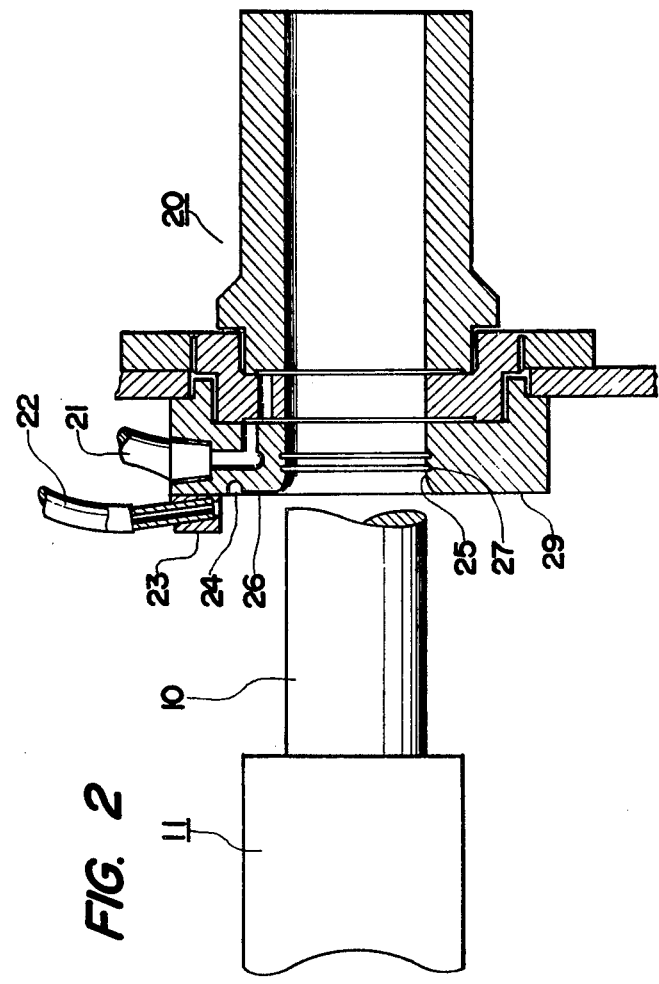

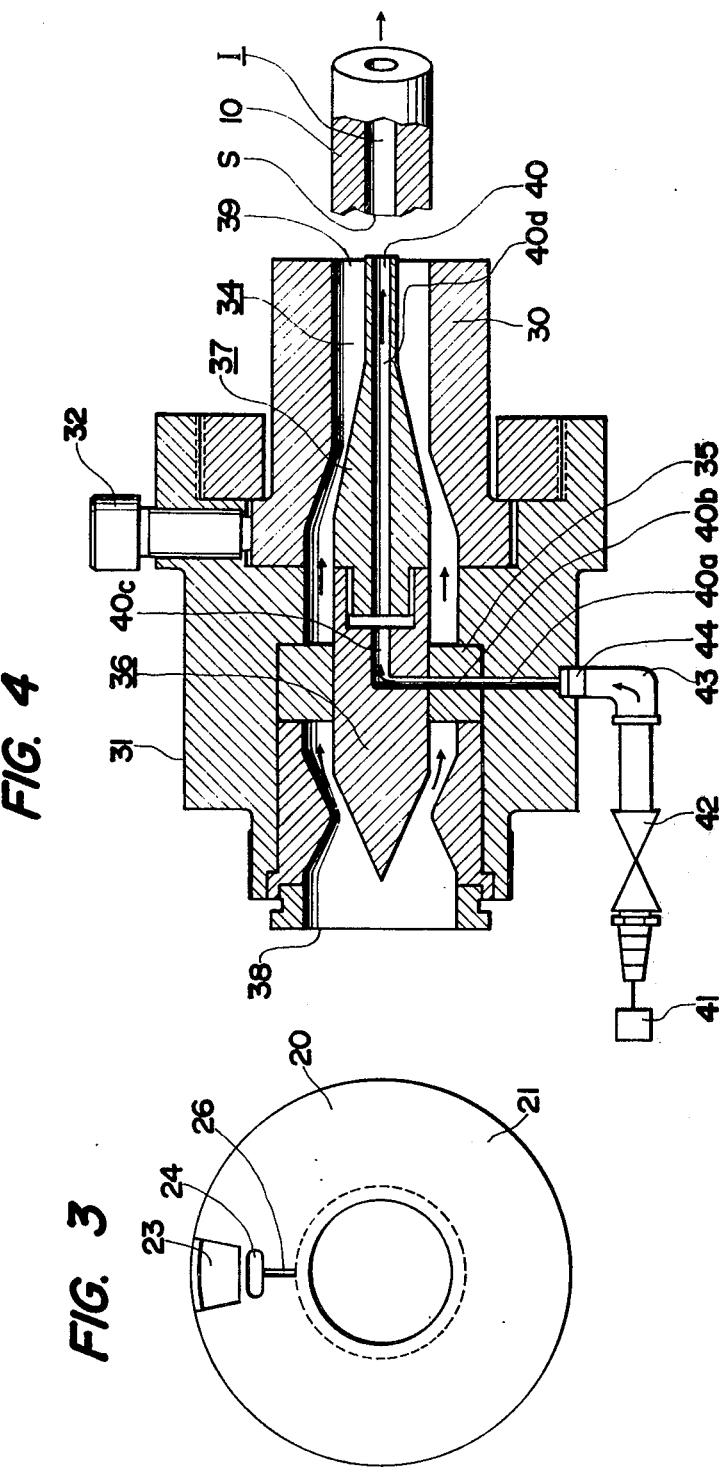

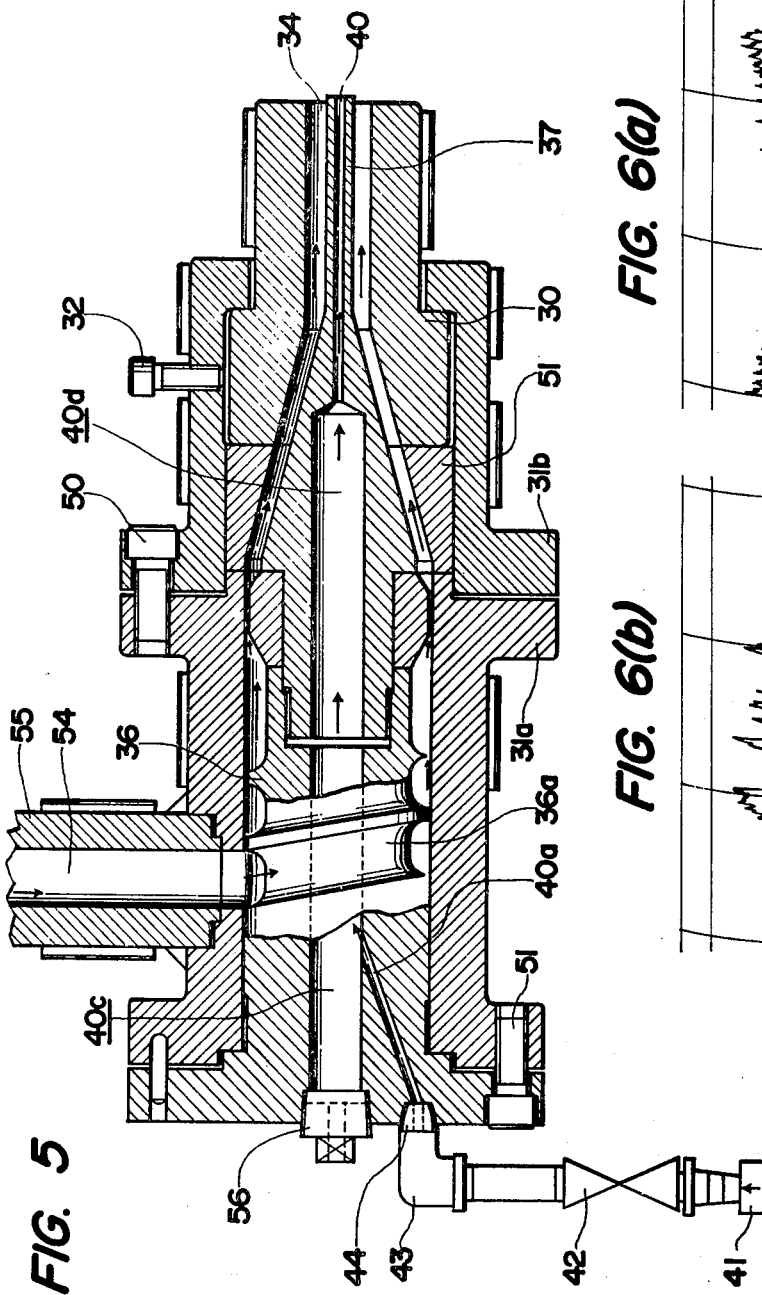
FIG. 5
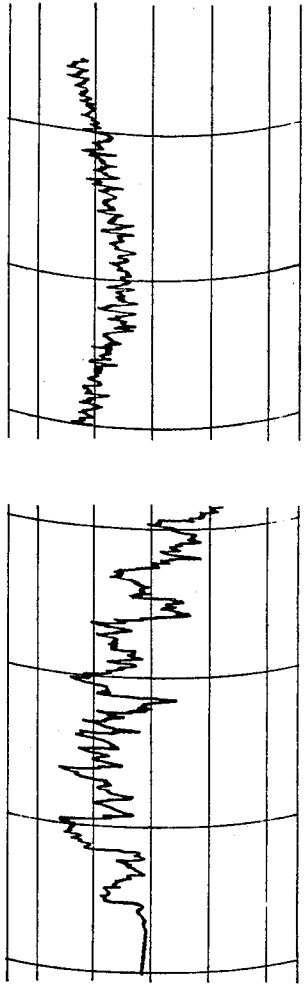
FIG. 6(a)
FIG. 6(b)

METHOD OF AND APPARATUS FOR TREATING THE OUTER SURFACE AND INNER SURFACE OF A PIPE OF A THERMOPLASTIC RESINOUS MATERIAL PRODUCED BY EXTRUSION

REFERENCE TO RELATED CO-PENDING APPLICATION

This is a divisional application from U.S. Ser. No. 507,276, filed Sept. 19, 1974 and now abandoned.

BACKGROUND OF THE INVENTION

This invention relates to a method of and an apparatus for treating the outer surface and inner surface of a pipe of a thermoplastic resinous material produced by extrusion so as to increase the luster on the surface of the pipe and additionally increase the stability of molding of the pipe. This invention also relates to a method of and an apparatus for smoothening the inner surface of a pipe of a thermoplastic resinous material which is produced by extrusion from the extruder.

Pipes of a thermoplastic resinous material are generally produced by extrusion molding. In this process, a pipe of a thermoplastic resinous material extruded in a molten condition is passed through a sizing die in a sizer to be sized. The luster on the surface of such pipe may vary depending on the temperature of the pipe at which it passes through the sizing die. In an ordinary thermoplastic resinous material, the temperature showing the highest value of its physical character is different from the temperature at which its surface luster becomes highest. Generally, it is more important to improve the physical character. Thus, it has hitherto been customary to use the temperature which shows the highest value of the physical character at the sacrifice of the surface luster.

Pipes of a thermoplastic resinous material lose their surface luster due to the influence of temperature. This defect of pipes of a thermoplastic resinous material is attributed to the intermittent movement of the pipes generally referred to as a stick and slip which is caused to occur by the adoption of a vacuum method or internal pressure method when the pipes are passed through the sizing die.

Pipes of a thermoplastic resinous material produced by extrusion molding by means of an extruder are used for producing various final products including, for example, bottles and other hollow articles which are made by blow molding from the thermoplastic resinous pipes. Methods of the prior art of producing transparent bottles by using a pipe of a thermoplastic resinous material, such for example as polypropylene, and elongating the same biaxially have the disadvantage of unable to produce transparent bottles because of the appearance of a cloud in the bottles produced. Research carried out to obviate this disadvantage has shown that the cloud in the body of the bottle is due to the roughness of the inner surface of the bottle, and the surface roughness exists on the inner surface of the pipe which is produced by extrusion as an intermediate product. More specifically, the refraction and irregular reflection of light by minuscule irregularities on the inner surface of the product are responsible for the cloud. It is possible to render smooth the outer surface of the intermediate or final product by mechanical means. However, in the case of hollow articles produced by blow molding, difficulty is experienced in mechanically smoothening the inner surface of the intermediate product or final product.

SUMMARY OF THE INVENTION

An object of this invention is to provide a method of and an apparatus for treating the outer surface of a pipe produced by extrusion which permits to produce a pipe of high surface luster by providing a lubricant to the extruded pipe and the inner wall of the sizing die.

In one aspect of the invention, means for providing a lubricant to the pipe is provided at a front end of the sizing die on the extruder side. The lubricant used may be selected from the group comprising a surface active agent, wax, silicone oil and soap water. A surface active agent is particularly preferred because it is separated from the pipe by a cooling medium, e.g. water, which is contained in the cooling tank following the sizer when the pipe is cooled. The means for providing a lubricant to the pipe according to the invention which disposed in the sizing die is spaced apart from the extruder. Thus, it is not necessary to use a lubricant which is heat resistant, because a portion of the pipe extruded from the extruder and lubricated is slightly reduced in temperature.

One of the outstanding characteristics of the invention is that the means for supplying a lubricant is provided at the front end portion of the sizing die as aforementioned. By virtue of this feature, it is not necessary to limit the lubricant used to one which is heat resistant. Moreover, the lubricant providing means comprises a recess formed at the front end of the sizing die. This feature is effective to supply the lubricant in a continuous stream of constant flow rate to the pipe by storing the lubricant in the recess, even if the supply of the lubricant through the lubricant supply line is irregular and intermittent.

The invention eliminates the need to mount an additional lubricant supply device between the extruder and the sizing die, so that it is possible to obtain an overall compact size in an apparatus for producing a thermoplastic resinous pipe by extrusion.

According to the invention, the volume of a lubricant supplied to a pipe is determined by the rate at which the pipe is produced, so that the volume of the lubricant supplied is stabilized and the lubricant can be supplied in a suitable volume.

Another advantage offered by the means for supplying a lubricant according to the invention is that ring-shaped grooves are provided in the interior of the sizing die cavity. This enables a lubricant to be supplied in uniform quantity to all the portions of outer periphery of the pipe, so that the loss of and irregularities in luster caused by sizing can be minimized.

Another object of the invention is to provide a method of and an apparatus for smoothening without using mechanical means, the inner surface of a thermoplastic resinous pipe produced by extrusion whereby transparent hollow articles can be produced from the pipe.

In another aspect of the invention, means is provided for introducing into the bore of a thermoplastic resin pipe extruded from the extruder an inert gas, such for example as nitrogen gas, carbon dioxide, helium gas or the like. A passageway for the inert gas is formed in the mandrel and the torpedo of the extruder and maintained in communication with the source of supply of the inert gas.

It is not clear why introduction of an inert gas into the bore of the thermoplastic resin pipe renders its inner surface smooth. It is presumed, however, that a factor concerned in smoothening the inner surface is that oxidation of the resin extruded in molten state at elevated temperature is prevented by the presence of the inert gas and occurrence of irregularities on the inner surface is precluded.

The invention makes it possible to produce a thermoplastic resin pipe which has a smooth inner surface when the molding of the pipe and the production of hollow articles by blow molding from the pipe are carried out continuously. This feature of the invention provides the benefit of continuous production as a secondary effect. When production methods of the prior art are used, the inner surface of the thermoplastic resin pipe is very rough, so that it is impossible to provide a perfect seal by a pinching operation and the air of high pressure blown into the pipe for blow molding tends to move back toward the extruder. This has often resulted in the accident of rupture of the pipe occurring in the neighborhood of the die at the front end of the extruder. A thermoplastic resin pipe produced by the method according to the invention can have its inner surface sealed completely, so that the aforementioned disadvantage of the prior art can be eliminated.

This invention has particular utility when the thermoplastic resinous material is highly crystalline solid polymers of mono-α-olefins having a carbon number up to 6, such for example as ethylene polymers of high density, isotactic polypropylene, poly-4-methyl-1-pentene, polybutene-1 or the like.

BRIEF DESCRIPTION OF THE DRAWINGS

FIG. 1 is a process flow diagram showing the steps of production of final products;

FIG. 2 is a sectional view of a sizing die provided with means for treating the outer surface of a pipe according to the invention, shown together with the extruder and a pipe;

FIG. 3 is a right side view of the sizing die shown in FIG. 2;

FIG. 4 is a sectional view of the piping die provided with means for treating the inner surface of a pipe according to the invention;

FIG. 5 is a view similar to FIG. 4 but showing another embodiment of the invention;

FIG. 6(a) is a graph showing the roughness curve of the inner surface of a bottle produced by blow molding from a pipe produced by the method according to the invention;

FIG. 6(b) is a graph showing the roughness curve of the inner surface of a bottle produced by blow molding from a pipe produced by a method of the prior art;

DESCRIPTION OF EMBODIMENTS

Figure 7:
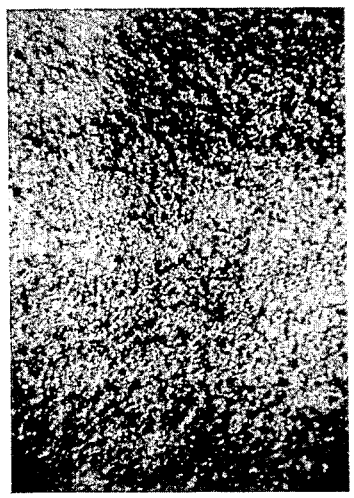
FIG. 7(a) is a microscopic photograph of the inner surface of a pipe produced by the method according to the invention.
FIG. 7(b) is a microscopic photograph of the inner surface of a pipe produced by a method of the prior art.
Figure 7:
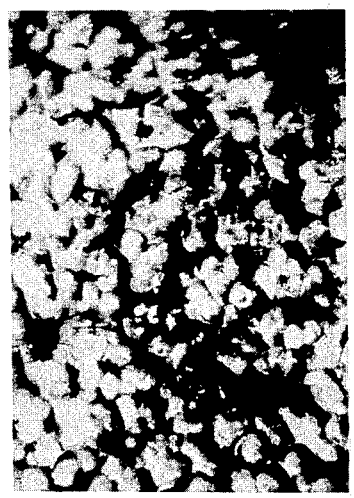

Referring to FIG. 1, an extruder 11 is employed to extrude a polypropylene pipe 10. The pipe 10 is passed through a sizer 12 to a cooling tank 13 where it is cooled below the crystalline temperature. If the pipe 10 is made of polypropylene, crystallization can be expedited by heating the pipe to about under 120° C. Suitable drive means (not shown) is used to move the pipe 10 from the extruder 11 to the sizer 12 and cooling tank 13.

After being heated again at a heating furnace 14 to a temperature which is slightly lower than its crystalline melting point (about 140° C. to 167° C. in case of polypropylene pipe), the pipe 10 is supplied through a draw cone 17 to a pair of mold members 15 and 16. The mold members 15 and 16 which alternately grip the pipe 10 and move away from the heating furnace 14 the same through the cone 17 to orient the pipe 10. The mold member 15 grips the pipe 10 and moves away the same from the heating furnace 14 to stretch and orient the pipe 10. While the pipe 10 is being elongated by the mold member 15, the other mold member 16 remains in an open position and moves toward the heating furnace 14 and stops position adjacent the elongated pipe where it closes on the pipe 10 and grips the same and moves away from the heating furnace 14 to stretch a new portion of the pipe 10 emerging from the heating furnace 14.

After the mold member 16 closes and is moving away from the heating furnace 14, the mold member 15 which has previously gripped the pipe 10 and moved in a direction in which it moves away from the heating furnace 14 opens to release a bottle 18 made from the pipe 10 in the mold member 15. Thereafter, the mold member 15 moves toward the heating surface 14 to repeat the aforementioned cycle. The mold members 15 and 16 are each connected to a pressure source which supplies pressure to the mold members 15 and 16 to expand the pipe 10 to form the bottle 18. The bottle 18 thus formed is moved to a final finishing position where it is separated from the other bottles, flash removed, the neck of the bottle trimmed and bored to final size.

This invention relates to the art of treating the inner surface of the pipe 10 when the pipe 10 is extruded through the extruder 11 and the outer surface of the pipe 10 when the pipe 10 is passed through the sizer 12.

Referring to FIG. 2 and FIG. 3, the pipe 10 extruded from the extruder 11 is sized by a sizing die 20 which is connected to a source of vacuum (not shown) through a vacuum line 21 so as to carry out sizing smoothly. The aforementioned construction is known.

According to the invention, pipe lubricating means is provided at a front end portion 29 of the sizing die 20 which is disposed in spaced juxtaposed relation with the extruder 11. The pipe lubricating means comprises a lubricant supply means comprising a lubricant supply opening 23 formed at the front end portion 29 of the sizing die 20 and maintained in communication with a lubricant supply line 22, a recess 24 formed in the vicinity of the lubricant supply opening 23 and a groove 26 extending downwardly from the bottom of the recess 24 to a sizing cavity 25, and ring-shaped grooves 27 formed in the sizing cavity 25 and disposed slightly inwardly of its end surface.

Lubricant supplied through the lubricant supply line 22 moves through the lubricant supply opening 23. Although part of the lubricant is stored in the recess 24, the major portion thereof passes through the grooves 26 and reaches the sizing cavity 25. The lubricant supplied in this way adheres to the outer surface of the pipe 10 as it is extruded from the extruder 11 and introduced into the sizing cavity 25. However, the lubricant is introduced into the ring-shaped grooves 27 from which it is spread in a thin film of uniform thickness on the outer surface of the pipe 10. Thus, the outer surface of the pipe 10 is prevented from becoming rough in texture when the pipe 10 passes through the sizing die 20. The results of experiments show that surface luster of the pipe produced by the method according to the invention is increased twice or three times as high as that of the pipe produced by a method of the prior art.

In the embodiment shown and described, two ring-shaped grooves 27 are formed in the sizing cavity 25. By arrangement, the lubricant can be spread onto the outer surface of the pipe 10 in a thin film of uniform thickness. It is to be understood, however, that the invention is not limited to this number of the ring-shaped grooves, and that the ring-shaped grooves may be provided in a suitable number depending on the viscosity of the lubricant or other factors.

An apparatus comprising one embodiment of the invention will now be described with reference to FIG. 4. The outer die 30 is mounted on a die holder 31 in such a manner that its position can be radially adjustable by an adjusting member 32. The die 30 is formed in its interior with an annular resin passageway 34 for the extruded resinous material. Supported by a spider 35 and disposed in the central portion of the passageway 34 is an internal mandrel 36 which has a torpedo 37 mounted at its rear end. A molten resin extruded from the extruder (not shown) is introduced into the die 30 through an inlet port 38, passes through the annular resin passageway 34 defined by the die holder 31, die 30, mandrel 36 and torpedo 37 and is discharged from the die 30 through an outlet port 39. When the resin is discharged from the die 30, it is in the form of a pipe. The aforementioned construction is known.

According to the invention, means is provided for supplying inert gas to the interior I of the pipe 10 in order to render its inner surface S smooth. As shown, a passageway 40 for the inert gas is formed in the central portion of the torpedo 37 and connected through a valve 42 to an inert gas supply source 41 mounted at the outside. The inert gas passing through the valve 42 moves through a pipe 43 into an inlet port 44 formed in the die holder 31, from which the inert gas moves through a passageway portion 40a formed in the die holder 31, a passageway portion 40b formed in the spider 35, a passageway portion 40c formed in the mandrel 36 and a passageway portion 40d formed in the torpedo 37 into the interior I of the pipe 10. It is to be understood that the invention is not limited to this arrangement of passageway portions 40a to 40d and that the arrangement can be varied as desired. FIG. 5 shows another arrangement of the passageway portions.

The embodiment shown in FIG. 5 is substantially similar to that shown in FIG. 4, and like reference characters designate similar parts. In FIG. 5, the die holder 31 comprises a first holder portion 31a and a second holder portion 31b which are connected together by bolts 50. The die 30 can have its mounting position adjusted radially by the adjusting means 32. The torpedo 37 is disposed in the central portion of the resin passageway 34 in the outer die 30. The axial position of the die 30 is determined by a bush 51. The mandrel 36 which has a screw portion 36a is secured to the first holder portion 31a through bolts 52. A tubular member 55 formed therein with a resin passageway 54 is connected to the side of the first holder portion 31a. Thus, the molten resin moving through the passageway 54 is introduced into the die 30 and discharged therefrom through the annular passageway 34 to produce a pipe.

In this embodiment, the gas passageway 40 formed in the central portion of the torpedo 37 is connected, through a passageway 40d, a center passageway portion 40c in the mandrel 36, and a passageway portion 40a formed at one side of the mandrel 36, to a passageway 44 which is connected to the inert gas supply source 41 through the pipe 43 and valve 42 as is the case with the aforementioned embodiment. The passageway 40c is closed at its end by a plug 56. However, if desired, the passageway 40a may be dispensed with and the plug 56 may be eliminated, so that the passageway 40c can be connected at its end to the passageway 44.

The operation of the embodiment shown in FIG. 5 and the benefits achieved thereby are similar to those of the embodiment shown in FIG. 4.

The example of the method according to the invention will be described in detail with reference to the apparatus shown in FIG. 4 adapted to carry the method into practice.

In the apparatus shown in FIG. 4, the temperature at the front end of the outer die 30 was set at 240° C., and then the valve 42 was adjusted to introduce carbon dioxide into the passageway 40 at a rate of 5 liters per minute. A polypropylene resin was supplied to the extruder 11 at a rate of 40 kilograms per hour and extruded therefrom into the sizer 12 so as to produce a pipe of an outer diameter of about 30 mm and of an inner diameter of about 12 millimeters at a rate of 1.5 meters per minute. The pipe produced in this way was heated again to about 155° C., elongated lengthwise to about four times its original length and subjected to blow molding by gripping the pipe by a split metallic mold, so as to produced a bottle of a thickness of about 0.5 millimeter and a volume of 650 cubic centimeters. The bottle was quite transparent.

As a control experiment, air was supplied at a rate of 5 liters per minute according to the prior art in place of carbon dioxide to the passageway 40. A pipe was extruded and a bottle was produced by blow molding from the pipe in the same manner as aforementioned. The bottle produced had a cloud all over the body, and there were partially darker and lighter areas.

Several sample strips were prepared from the side wall of each of the two types of bottles in such a manner that their major axes are parallel to one another axially. The roughness of the inner surfaces of the sample strips of the bottles was measured by using a surface roughness meter (a universal surface shape testing machine of the SE-3A type made by Kosaka Institute, Inc. in Japan). The results of tests are shown in FIG. 6(a) and FIG. 6(b). It will be seen that whereas the irregularities formed on the inner surface of the bottle produced by the method according to the invention are only about 2 microns in size as shown in FIG. 6(a), the irregularities formed on the inner surface of the bottle produced by the prior art are 8 microns or more.

In order to directly determine the benefit achieved by the invention, the inner surfaces of a pipe produced according to the invention and of a pipe produced by the prior art were photographed and magnified 30 times. The results are shown in FIG. 7(a) and FIG. 7(b). It will be seen that, as shown in FIG. 7(a), the inner surface of the pipe produced by the method according to the invention is substantially smooth, but the inner surface of the pipe produced by the method of the prior art has considerably large irregularities formed therein in a disorderly manner.

We claim:

1. Apparatus for manufacturing a pipe of a crystalline mono-α-olefin polymer having a smooth outer surface, which is suitable for manufacturing a biaxially orientated container by blow molding, comprising:

a sizing die for sizing extruded pipe, said sizing die having a front end portion and a pipe-receiving sizing cavity extending inwardly from said front end portion;

and means on said sizing die for supplying a water soluble surface active agent to lubricate the outer surface of a pipe being introduced into said sizing cavity, said means having a surface active agent supply opening formed at said front end portion of said sizing die above said sizing cavity, a surface active agent supply line in communication with said supply opening, a recess formed in said front end portion of said sizing die in the vicinity of said supply opening, a groove formed in said front end portion of said sizing die and extending downwardly from said recess to said sizing cavity, and at least one ring-shaped groove formed in said sizing cavity and disposed slightly inwardly of said front end portion to provide a continuous film of surface active agent which adheres to said pipe.

2. In an apparatus for manufacturing a pipe of a crystalline mono-α-olefin polymer having a smooth outer surface, which is suitable for manufacturing a biaxially orientated container by blow molding, comprising:

extruding means having an extruder for extruding a crystalline polyolefin continuous pipe;

means having a sizing die through which the pipe extruded by said extruding means is passed, said sizing die having a front end portion and a pipe-receiving sizing cavity extending inwardly from said front end portion;

a cooling tank containing cooling water therein for receiving pipe from said sizing die;

means having a furnace for heating the pipe passed through said cooling tank to a temperature which is below the crystalline melting point of the pipe, means for elongating the pipe passed through said furnace lengthwise thereby stretching the pipe, a mold for receiving the stretched pipe and means for applying fluid pressure within a pipe portion inside said mold to expand the pipe portion to the contour of the mold, the improvement comprising:

means on said sizing die for supplying a water soluble surface active agent to lubricate the outer surface of a pipe being introduced into said sizing cavity, said means having a surface active agent supply opening formed at said front end portion of said sizing die above said sizing cavity, a surface active agent supply line in communication with said supply opening, a recess formed in said front end portion of said sizing die in the vicinity of said supply opening, a groove formed in said front end portion of said sizing die and extending downwardly from said recess to said sizing cavity, and at least one ring-shaped groove formed in said sizing cavity and disposed slightly inwardly of said front end portion to provide a continuous film of surface active agent which adheres to said pipe.

3. An apparatus for manufacturing a pipe as claimed in claim 2, wherein said means for supplying said water soluble surface active agent is spaced from said extruder.

4. An apparatus for manufacturing a pipe as claimed in claim 2, wherein said extruder comprises a piping die having a pipe passageway including an inlet port and an outlet port and a torpedo in the central portion of said pipe passageway, a gas passageway for inert gas formed in the central portion of said torpedo and communicating at one end with said pipe passageway, an inert gas supply source for supplying inert gas to said pipe passageway, a valve connected between said source and said gas passageway, and a guide passageway connecting said gas passageway to said gas supply source through said valve.

* * * * *